(12) United States Patent
Courcambeck et al.

(10) Patent No.: US 7,333,613 B2
(45) Date of Patent: Feb. 19, 2008

(54) CYPHERING OF THE CONTENT OF A MEMORY EXTERNAL TO A PROCESSOR

(75) Inventors: Stephan Courcambeck, Saint Cyr sur Mer (FR); Claude Anguille, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 686 days.

(21) Appl. No.: 10/417,745

(22) Filed: Apr. 17, 2003

(65) Prior Publication Data

US 2003/0198344 A1 Oct. 23, 2003

(30) Foreign Application Priority Data

Apr. 19, 2002 (FR) .................... 02 04918

(51) Int. Cl.
*H04L 9/28* (2006.01)
*H04L 9/18* (2006.01)
*H04L 9/34* (2006.01)

(52) U.S. Cl. .................... 380/262; 380/29; 380/43; 713/193

(58) Field of Classification Search ............ 380/28, 380/37, 44–47, 29, 43, 262; 713/193
See application file for complete search history.

(56) References Cited

U.S. PATENT DOCUMENTS

| | | | |
|---|---|---|---|
| 4,322,576 A * | 3/1982 | Miller | ................... 380/29 |
| 4,907,275 A * | 3/1990 | Hashimoto | ............. 713/161 |
| 5,438,622 A | 8/1995 | Normile et al. | |
| 5,799,089 A * | 8/1998 | Kuhn et al. | ............. 380/37 |
| 5,825,878 A | 10/1998 | Takahashi et al. | |
| 5,982,887 A | 11/1999 | Hirotani | |

OTHER PUBLICATIONS

French Search Report from French Patent Application 02/04918, filed Apr. 19, 2002.

* cited by examiner

Primary Examiner—Gilberto Barrón, Jr.
Assistant Examiner—Venkat Perungavoor
(74) Attorney, Agent, or Firm—Lisa K. Jorgenson; James H. Morris; Wolf, Greensfield & Sacks, P.C.

(57) ABSTRACT

A method of cyphering, by an integrated processor, of a set of data to be stored in a memory, including performing, in a continuous operation following a data flow, the steps of dividing the data flow into blocks of predetermined size and, for each block: generating a cyphering key using a pseudo-random generator implementing a continuous algorithm of cyphering according to a key specific to the integrated circuit and of an initialization vector changing for each block; combining the data block and the corresponding key in a continuous operation; and storing in the memory each cyphered block and the initialization vector used to cypher it.

23 Claims, 3 Drawing Sheets

CYPHERING OF THE CONTENT OF A MEMORY EXTERNAL TO A PROCESSOR

BACKGROUND OF THE INVENTION

1. Field of the Invention

The present invention generally relates to cyphering or encryption of data, of programs or more generally of binary codes to be stored in one or several memories external to an integrated processor in charge of exploiting these codes.

2. Discussion of the Related Art

An example of application of the present invention is the encryption of target programs downloaded by a device (computer, video or audio data reader, device provided with a downloadable program execution microprocessor, etc.) in which these programs must be stored. The downloading may, for example, use the Internet. More specifically, the present invention relates to the programs or data for which it is desired to prevent exploitable access by a non-authorized user.

Reference will be made hereafter to "data" to indifferently designate any binary code, be it routines, or data processed by such routines.

FIG. 1 partially and very schematically illustrates the structure of a system with a microprocessor and an external memory to which the present invention applies. A so-called secure area 1 is defined, within which is arranged a CPU communicating, via one or several buses 3, with a memory 4 (EXT MEM) external to secure area 1. Area 1 is, for example, the integrated microprocessor or, more generally, one or several data processing integrated circuits defining a secure area within which it is considered that the processed data are not likely to be pirated. In practice, secure area 1 is most often formed of a single integrated circuit chip, external memory 4 being another chip.

The encryption to which the present invention applies is that of any data transiting on bus(es) 3, between memory 4 and CPU 2 or more generally area 1; This encryption includes coding the stored data by means of a key known by the integrated processor. Generally, this encryption key is transmitted thereto by an asymmetrical encryption process from the distant system providing the program, so that the processor stores it in a protected internal area, and uses it both to decypher the downloaded program and cypher the data in the external memory.

An example of a solution for cyphering a memory, external to a microprocessor integrated on a single chip, is described in U.S. Pat. No. 5,825,878. The solution advocated by this document is to integrate the direct access memory controller with the microprocessor core as well as an internal memory and a logic encryption/decryption circuit.

Other solutions for cyphering programs in a memory external to a microprocessor are described, for example, in U.S. Pat. Nos. 5,982,887 and 6,041,449.

In all cases, the cyphered program in the external memory is independent from the chip forming the execution microprocessor.

A first disadvantage is that the cyphering key of the program stored in the memory external to the microprocessor is not dedicated to the chip which cyphers the data. Thereby, in case one of the keys is pirated, it can be reused to decypher any external memory since all chips use a same type of cyphering.

A second disadvantage is linked to the cyphering method used. Generally, cypherings by blocks by algorithms of DES or AES type according to a so-called ECB technique (Electronic Code Book) are used. The size of a block depends on the cyphering algorithm used. In an ECB technique, two identical blocks are cyphered in the same way. A weakness then includes possible attacks by a so-called dictionary technique, where the redundancy of identically cyphered messages may enable identification of the clear message. As opposed to the ECB technique, another block cyphering technique is known, in which the cyphered code depends on the preceding blocks. This technique (CBC, Cypher Block Chaining) requires an always identical sequential access to the memory, which makes it incompatible for the cyphering of a program for which random direct accesses in the external memory are desired to be had.

More generally, a particular problem is posed when direct access is desired to the external memory, as opposed to a sequential operation. In such a case, the write cyphering in the memory and the read decyphering in this memory must be performed, continuously and sequentially in the same order by the processor exploiting them. Such direct access and continuous cyphering requirements make conventional solutions inapplicable to efficiently cypher the data of an external memory by blocks.

SUMMARY OF THE INVENTION

The present invention aims at providing a novel technique of cyphering, by an integrated circuit, of a set of data to be stored in a memory external to this circuit.

The present invention more specifically aims at providing a cyphering solution which enables individualizing the cyphering according to the integrated circuit chip to which the external memory is associated.

The present invention also aims at providing a cyphering compatible with the downloading of applications cyphered by means of so-called public and private key systems.

The present invention also aims at providing a cyphering insensitive to so-called dictionary attacks.

The present invention also aims at providing a cyphering which is compatible with a direct random access to the external memory.

To achieve these and other objects, the present invention provides a method of cyphering by an integrated processor of a set of data to be stored in a memory, comprising, in a continuous operation following a data flow, the steps of:

dividing the data flow into blocks of predetermined size and, for each block:

generating a cyphering key by means of a pseudo-random generator implementing a continuous algorithm of cyphering according to a key specific to the integrated circuit and to an initialization vector changing for each block;

combining the data block and the corresponding key in a continuous operation; and storing in said memory each cyphered block and the initialization vector used to cypher it.

According to an embodiment of the present invention, the combination is of X-OR type.

According to an embodiment of the present invention, the size of the cyphering key corresponds to the block size.

According to an embodiment of the present invention, said key specific to the integrated processor is generated by said processor.

According to an embodiment of the present invention, the method is applied to the cyphering of a target program to be stored, for subsequent execution, in said memory.

The present invention also provides a method for decyphering data blocks stored in a memory comprising the steps of:

reading each block and an associated initialization vector from said memory; and applying, for each block, a continuous decyphering algorithm using, to generate a decyphering key, the initialization vector associated with the concerned block.

According to an embodiment of the present invention, the decyphered data blocks are stored in a cache memory integrated to the processor.

According to an embodiment of the present invention, the data cyphered by blocks and the associated initialization vectors are stored in a cache memory integrated to the processor, before decyphering.

According to an embodiment of the present invention, said memory is external to the integrated circuit.

The present invention also provides a processor for exploiting data stored in an external memory.

The foregoing objects, features and advantages of the present invention, will be discussed in detail in the following non-limiting description of specific embodiments in connection with the accompanying drawings.

DETAILED DESCRIPTION

Figure 1:
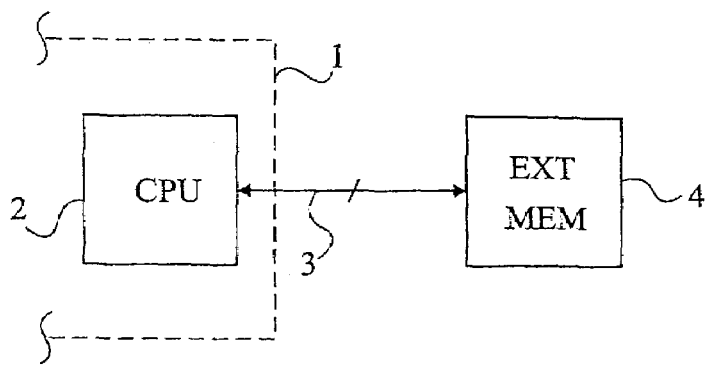
FIG. 1, previously described, partially and very schematically shows an integrated circuit associated with an external memory of the type to which the present invention applies.

The same elements have been designated with the same reference numerals in the different drawings. For clarity, only those steps of the method and those elements that are necessary to the understanding of the present invention have been shown in the drawings and will be described hereafter. In particular, none of the integrated processor components have been detailed, the present invention exploiting known components for its implementation.

A feature of the present invention is to cypher data (programs, data, binary codes of any sort) to be stored in an external memory associated with an integrated microprocessor, by means of a so-called internal key, specific to the microprocessor, which is different from the possible encryption key communicated by the provider or the data. This internal key may be individualized by groups of data (by programs). Thus, according to the present invention, when a program is downloaded to be stored in the external memory associated with the integrated processor, the cyphering does not use the key associated with the application (or program), but rather an internal key associated with the microprocessor chip. This enables making the external memories dependent on the integrated processors with which they are associated, which is an asset in terms of security against data piracy by unauthorized users.

Another feature of the present invention is to provide a continuous cyphering and decyphering upon transfers between the integrated microprocessor and the external memory. According to the present invention, this continuous cyphering is obtained from a division in blocks of the stored data. The present invention also provides for the cyphering to use one initialization vector for each block, this vector being a function of the processed block. Problems linked to continuous cypherings which are conventionally incompatible with direct random accesses to a memory are thus suppressed or eliminated.

In other words, the present invention provides a continuous cyphering, cut up into blocks, with use of an initialization vector to obtain a flow of codons forming respective block cyphering keys.

Figure 2:
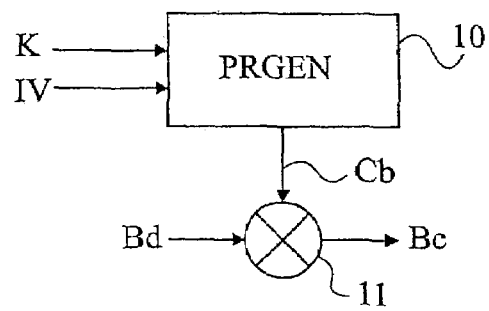
FIG. 2 is a simplified diagram of a cyphering generator used according to the present invention.

FIG. 2 schematically shows a continuous cyphering by means of initialization vectors with the help of a cyphering generator (cryptosystem). Such a cyphering is based on the use of a pseudo-random generator 10 (PRGEN) providing a key Cb for cyphering a data block Bd by means of an X-OR type gate 11. Gate 11 provides the cyphered result, that is, a block Bc cyphered by mean of key Cb. Key Cb provided by generator 10 is based on an internal key K corresponding according to the present invention to a key specific to the microprocessor, and on an initialization vector IV, these two values being exploited by an algorithm of generation of pseudo-random numbers. K, IV are binary words, the respective sizes of which depend on the desired security in terms of possible number of combinations. Key Cb is a binary word, the size of which depends, according to the present invention and as will be seen hereafter, on the size of the blocks to be cyphered. Generator 10 is pseudo-random in that for a given key K, it always provides the same key Cb for a same initialization vector IV. According to the present invention, initialization vector IV is a function of cyphered block Bd as will be described hereafter.

The diagram of FIG. 2 is generally known to provide a continuous cyphering, that is, a cyphering in which the input message of XOR gate 11 is cyphered bit by bit by the key continuously provided by generator 10. Reference is then made to what is called a codon generator. Such codons form the cyphering keys Cb of the present invention.

Continuous cyphering algorithms are described, for example, in work "Cryptographie Appliquée" by Bruce SCHNEIER, second edition, published by Wiley in 1997, pages 209 to 226, which is incorporated herein by reference.

Pseudo-random generator 10 is the base element of continuous cyphering algorithms. For example, it may be an algorithm chosen from among those known under denominations RC4, SEAL, WAKE, or more generally any continuous cyphering algorithm that can condition the pseudo-random generation of key or codon Cb based on K and IV. However, according to the present invention, this continuous cyphering is performed by blocks with a different initialization vector for each block. The "seed" of generator 10 changes for each block since it is formed of a combination of K and IV.

Figure 3:
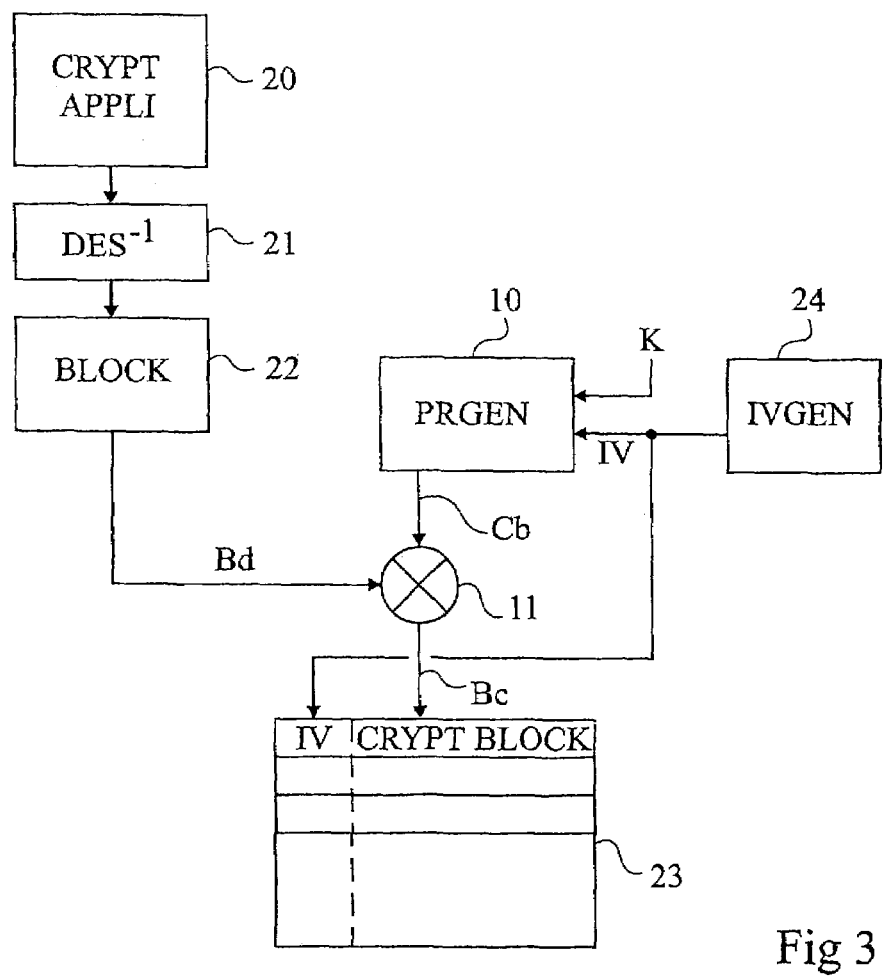
FIG. 3 illustrates, in the form of blocks, an implementation mode of the method of the present invention in a cyphering phase.

FIG. 3 illustrates a mode of implementation of a continuous cyphering of blocks of fixed size of a program (block 20, CRYPT APPLI) encrypted by an application provider, for example, by a DES-type algorithm. To implement the present invention, the program is first decrypted (block 21, DES-1). Once decrypted, a division of the program into blocks (block 22, BLOCKS) is performed according to the present invention to obtain a flow of blocks Bd to be cyphered before storage in a memory 23 external to the microprocessor.

The cyphering performed according to the present invention follows the scheme of FIG. 2 in that it uses a pseudo-random generator 10 (PRGEN) providing, for each block, a cyphering key Cb from an internal key K and specific to the microprocessor and from an initialization vector IV. Initialization vectors IV are, preferably, generated by a random generator (block 24, IVGEN) associated with the microprocessor and providing, for each block, a sequence of any bits. This enables maintaining a subsequent direct random access to any block stored in memory 23.

The size (number of bits) of the generated keys Cb is, according to the present invention, equal to the block size to enable continuous cyphering of the blocks.

According to the present invention, the initialization vector generated by generator 24 is stored in memory 23 at the same time as encrypted block Bc (CRYPT BLOCK) originating from gate 11. For example, the consecutive bits of initialization vector IV are placed at the beginning of the memory word storing block Bc. Any other configuration may be provided, the important thing being to associate, with each cyphered block stored in the external memory, an initialization vector which is specific thereto.

The fact that the initialization vector is stored clear in the external memory is no obstacle in the sense of the preset invention. Indeed, the knowledge of this initialization vector does not enable decyphering this block. The key K specific to the microprocessor having cyphered this block must further be known, as well as the codon generation algorithm which may be different from one processor to another. An advantage induced by the present invention here appears, which is that, while making the cyphering dependent from the microprocessor performing it, its implementation is transparent for the data provider. The cyphering internally performed is independent from the encryption performed by the data provider.

Figure 4:
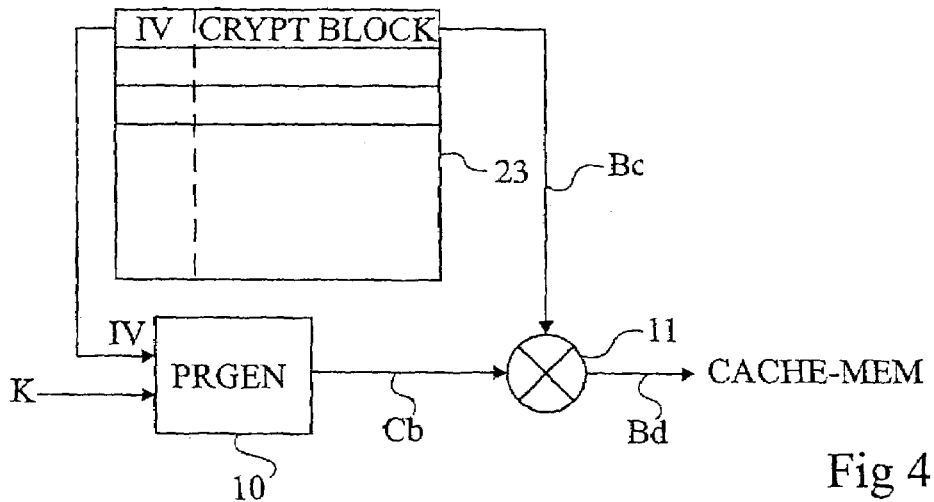
FIG. 4 illustrates, in the form of blocks, an example of implementation of the present invention in a decyphering phase.

FIG. 4 shows a mode of implementation of a decyphering performed, according to the present invention, by an integrated microprocessor exploiting the cyphered data in external memory 23. According to the present invention, the decyphering uses the same pseudo-random generator 10 of keys Cb and the same X-OR gate 11. The pseudorandom generator this time uses, as "seeds" of generation of keys Cb, key K specific to the integrated processor and initialization vector IV read from memory 23 and associated with the current block to be decyphered. The XOR combination of block Bc with key Cb provides decyphered data block Bd which is stored in a cache memory (CACHE MEM) of the microprocessor. Although this has not been indicated in relation with FIG. 3, this cache memory is also used upon cyphering to temporarily store the cut-up blocks to be cyphered. Preferably, the length of a block is the same as the length of a line of the cache memory.

Figure 5:
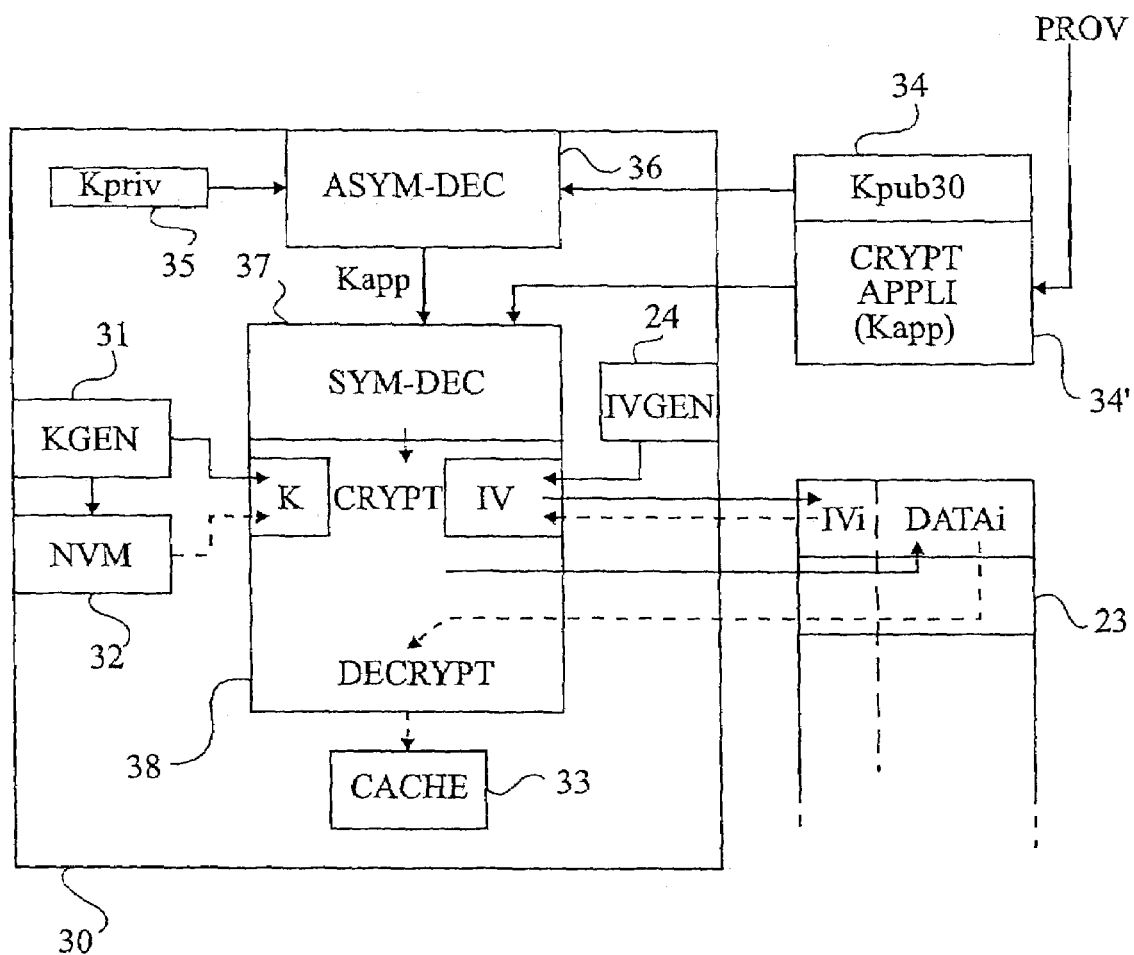
FIG. 5 partially and schematically shows an integrated microprocessor associated with an external memory according to a first embodiment of the present invention.

FIG. 5 partially and schematically shows an integrated microprocessor 30, associated with an external memory 23 according to a first embodiment of the present invention. The embodiment of FIG. 5 integrates the elements necessary to the implementation of the cyphering/decyphering method illustrated by FIGS. 3 and 4. Thus, microprocessor 30 comprises a generator 31 (KGEN) of a key K specific to the circuit. This key, once generated, is stored in a non-volatile memory 32 (NVM). Generator 31 is, for example, a random generator or a circuit exploiting a binary word originating from a physical parameter network of the chip integrating microprocessor 30. In this last case, key K can be generated each time it is needed. As an alternative, key K is generated externally and stored in memory 32. However, a generation within the microprocessor is preferable for reasons of security against possible piracies. Circuit 30 also integrates generator 24 (IVGEN) of initialization vectors IV as well as a cache memory 33 (CACHE).

The embodiment illustrated in FIG. 5 applies to a microprocessor capable of receiving programs (or more generally, any digital data) from an external source. For example, a provider (PROV) sends, into a memory (for example, a RAM) 34', the codes of a program (CRYPT APPLI) encrypted by a secret key Kapp, key Kapp being for example cyphered by an asymmetrical algorithm based on a public key sending by provider PROV or by the microprocessor according to the key with which key Kapp is coded. In the example shown, the chip receives key Kapp encrypted by its public key (designated as Kpub30, block 34). To enable decryption of the program, processor 30 comprises (in software or wired manner) an asymmetrical decoder 36 (ASYM-DEC) exploiting a private key Kpriv stored in a storage element 35 of processor 30 (as an alternative, a public key provided by provider PROV). Decoder 36 decrypts, in a conventional fashion, key Kapp. This encryption key of the program is then used, by a symmetrical decyphering block 37 (SYM-DEC), to decode the encrypted application read from memory 34. Up to now, processor 30 executes conventional steps of decryption of a program encrypted by a public and private key algorithm.

According to the present invention, circuit 30 integrates (in wired fashion or not) a continuous block cyphering/decyphering unit 38 (CRYPT-DECRYPT), implementing the method illustrated in FIGS. 3 and 4. Thus, unit 38 contains, although not shown in FIG. 5, pseudo-random generator 10 as well as XOR gate 11.

In FIG. 5, arrows in full lines illustrate the operation of circuit 30 upon cyphering of a downloaded application, and arrows in dotted lines illustrate the operation upon decyphering of the program stored in the memory (here, target) 23.

Thus, entity 38 exploits key K generated by generator 31 upon program cyphering as well as the successive initialization vectors provided by generator 24. However, for the decyphering, key K stored in non-volatile memory 32 and the successive initialization vectors IVi associated with data blocks DATAi stored in memory 23 are used. Upon cyphering (CRYPT), the data blocks cut up by entity 38 are stored in memory 23. Upon decyphering (DECRYPT), these blocks read (by direct random access) are, once decyphered, stored in cache memory 33 to be executed.

The block size is, preferably, adapted according to the downloaded program so that, while remaining compatible with the size of cache memory 33, each block corresponds to one or several complete instructions.

An advantage of the present invention is that the cyphered data are cyphered by a single key identifying the integrated circuit chip processing them. Accordingly, knowing the key does not enable pirate use, since it does not enable decyphering the same data if they are stored in an external memory associated with another integrated microprocessor.

Another advantage of the present invention is that, since the integrated microprocessor generates itself its own keys to store the data in the external memory, it is possible to generate a new key each time these data are used. For example, in the case of a program, when the program is executed, the blocks which are rewritten from the cache memory to the external memory are cyphered with new keys. These new keys (codons) are obtained by changing key K and/or the block initialization vectors. An advantage of such an alternative is that the cyphering keys then change each time a program is executed, which makes a possible piracy even more difficult.

An advantage of using a continuous cyphering algorithm is that this type of algorithm is much faster than block cyphering algorithms of AES or DES type. An XOR-type operation for a cyphering or a decyphering as well as a stimulation (starting of the pseudo-random generator) are sufficient.

In the embodiment illustrated in FIG. 5, the heaviest operations (in terms of duration) are executed upon program installation for storage in cyphered fashion in memory 23. However, as compared to the time required by the machine resources used to decrypt the program received from the outside (PROV), the cyphering added by the present invention is negligible. Further, for the subsequent operations, the cyphering of the present invention is considerably faster than by maintaining a DES-type cyphering.

It should however be noted that the present invention also applies to the cyphering of an uncrypted downloaded program, that is, omitting asymmetrical and symmetrical decoding elements 36 and 37 of FIG. 5.

According to an alternative, an integrity control value in memory 23 may be associated to cyphered block DATAi and to initialization vector IV.

Figure 6:
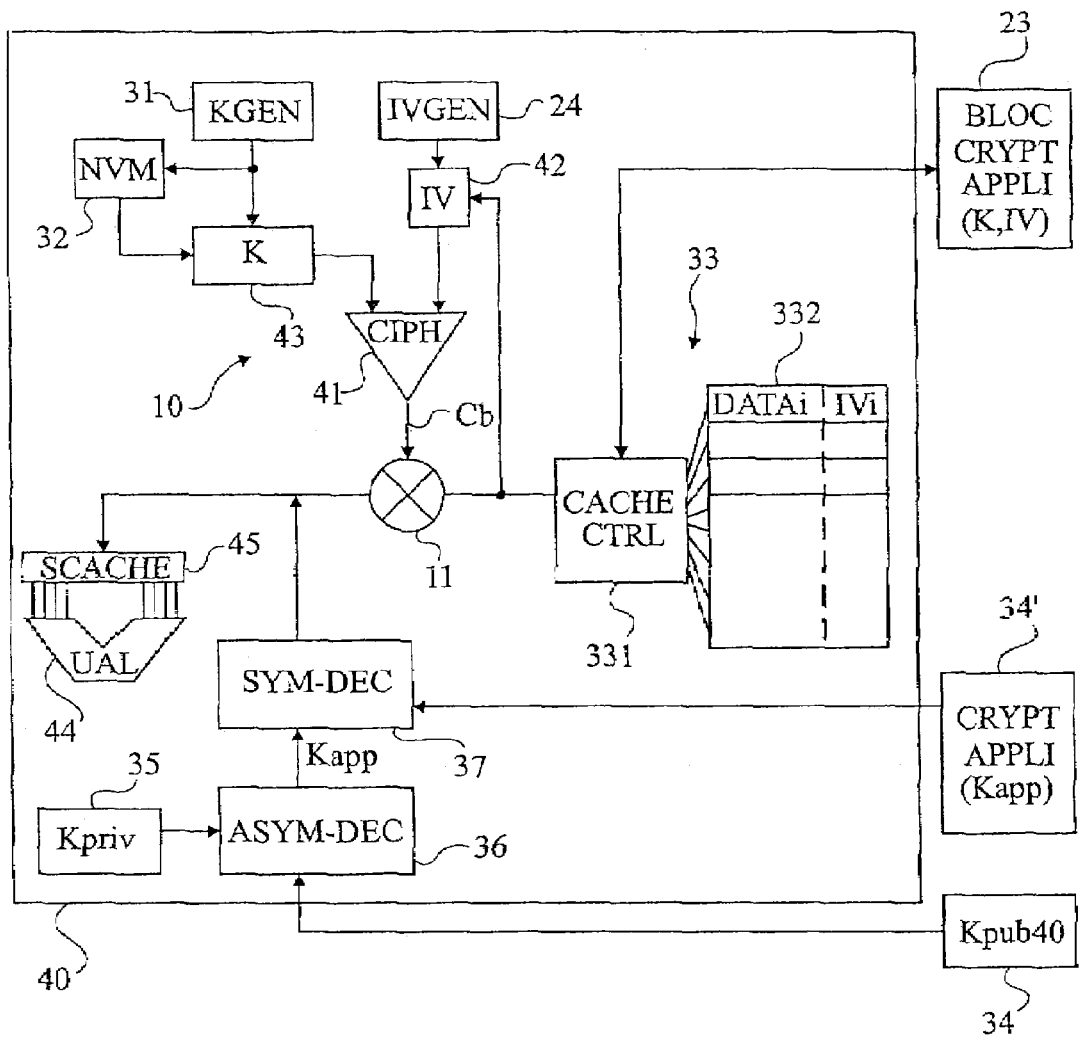
FIG. 6 partially and schematically shows an integrated microprocessor associated with an external memory according to a second embodiment of the present invention.

FIG. 6 shows a second embodiment of an integrated processor 40 implementing the present invention. According to this embodiment, the cyphering/decyphering is performed at the input of the actual processor, that is, at the input of its arithmetic and logical unit 44. It is then aimed at cyphering the content of the cache memory. This objective seems to be contradictory with the function of such a memory, which is to accelerate the processing of a program with respect to the read access needs of an external memory. However, by the implementation of the present invention, a cyphering remains possible since it is performed in a continuous operation and by means of a simple XOR gate, which only negligibly slows down the program execution or the data processing.

In the embodiment of FIG. 6, as in FIG. 5, the loading or initialization of a program itself encrypted by means of a symmetrical algorithm is assumed. Accordingly, FIG. 6 shows blocks 36 (ASYM-DEC), 37 (SYM-DEC) respectively receiving the application key Kapp encrypted by the public key of chip 40 (designated as Kpub40, block 34), and cyphered program CRYPT APPLI (block 34'). In the example shown, asymmetrical decryption block 36 further receives private key Kpriv from block 35.

As in FIG. 5, are also shown generator 31 (KGEN) of key K, generator 24 (IVGEN) of initialization vectors IV, and non-volatile memory 32 (NVM) of storage of key K. In FIG. 6, pseudo-random generator 10 has been illustrated in the form of a cyphering element 41 (CIPH) receiving as an input an initialization vector IV stored in a register 42 and key K stored in a register 43, and outputting code Cb to gate 11. According to this embodiment, gate 11 is interposed between cache memory 33 and arithmetic and logic unit 44 of the processor. In fact, a single additional cache memory line 45 (SCACHE) is provided at the input of arithmetic and logic unit 44. This line is supplied by the output of gate 11. In FIG. 6, cache memory 33 has been detailed in the form of a cache controller 331 (CACHE CTRL), supplied by actual cache memory lines 332. According to this embodiment, the data stored in lines 332 of the cache memory are cyphered and thus correspond to the blocks stored, as in FIG. 5, in external memory 23 which thus contains the data or the program (BLOC CRYPT APPLI) cyphered by means of key K and of vectors IV. Thus, initialization vector IVi and data DATAi of each block are present in the lines of cache memory 332.

The operation of the embodiment illustrated in FIG. 6 can be deduced from the operation previously discussed in relation with FIG. 5. It should only be noted that, upon cyphering, the flow originating from block 37 is cut up into blocks to be cyphered by gate 11 and transits through the cache memory controller without being stored in lines 332, but being directly directed to memory 23.

Of course, the present invention is likely to have various alterations, modifications, and improvement which will readily occur to those skilled in the art. In particular, the present invention may be implemented with any conventional continuous cyphering algorithm, conditioning the pseudo-random generator from key K and vectors IV. Further, the practical implementation of the present invention is within the abilities of those skilled in the art based on the functional indications given hereabove. On this regard, it should be noted that according to an embodiment of the present invention, the different cyphering and decyphering tools (even those used only once upon storage of the data coming from outside) are formed in wired logic. However, a software implementation remains possible. Further, other combination functions than the XOR may be provided, the XOR however being a preferred choice due to its simplicity (and thus its rapidity).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of cyphering by an integrated processor of a set of data to be stored in a memory comprising, in a continuous operation following a data flow, the steps of:
   dividing the data flow into blocks of predetermined size and, for each block;
   generating a cyphering key by means of a pseudo-random generator implementing a continuous algorithm of cyphering according to a key specific to the integrated processor and to an initialization vector changing for each block;
   combining the data block and the corresponding key in a continuous operation; and
   storing in said memory each cyphered block and the initialization vector used to cypher it.

2. The method of claim 1, wherein the combination is of X-OR type.

3. The method of claim 1, wherein the size of the cyphering key corresponds to the block size.

4. The method of claim 1, wherein said key specific to the integrated processor is generated by said processor.

5. The method of claim 1, applied to the cyphering of a target program to be stored, for subsequent execution, in said memory.

6. A method for decyphering data blocks stored in a memory comprising the steps of:
   reading each block and an associated initialization vector from said memory; and
   applying, for each block, a continuous decyphering algorithm using, to generate a decyphering key, the initialization vector associated with the block, applied to data cyphered by applying the method of claim 1.

7. A processor for exploiting data stored in an external memory, comprising means for implementing the cyphering method of claim 1.

8. An apparatus comprising:
a non-volatile memory to store a value specific to the apparatus;
a first pseudo-random number generator to generate a plurality of initialization vectors, each initialization vector corresponding to a subset of data of a set of data;
a second pseudo-random number generator to generate an encryption key based on the value specific to the apparatus and one initialization vector of the plurality of initialization vectors;
a combining circuit to combine the subset of data with the encryption key to provide an encrypted subset of data; and
a memory to store the encrypted subset of data and the one initialization vector.

9. The apparatus of claim 8, wherein the value specific to the apparatus is generated outside the apparatus and provided to the apparatus.

10. The apparatus of claim 8, wherein the value specific to the apparatus is generated within the apparatus.

11. The apparatus of claim 10, wherein the value specific to the apparatus is generated within the apparatus by a third pseudo-random generator taking as input a binary word originating from a physical parameter network of the apparatus.

12. The apparatus of claim 8, wherein the combining circuit comprises an X-OR type gate.

13. The apparatus of claim 8, wherein a size of the encryption key corresponds to a size of the subset of data.

14. The apparatus of claim 8, wherein the set of data is a set of computer-executable instructions to be stored, for subsequent execution, in the memory.

15. An apparatus comprising:
a memory to store an encrypted version of a subset of data of a set of data and an initialization vector associated with the subset of data;
a non-volatile memory to store a value specific to the apparatus;
a pseudo-random number generator to generate a decryption key based on the value specific to the apparatus and the initialization vector; and
a combining circuit to combine the encrypted version with the decryption key to provide the subset of data.

16. The apparatus of claim 15, wherein the value specific to the apparatus is generated outside the apparatus and provided to the apparatus.

17. The apparatus of claim 15, wherein the value specific to the apparatus is generated within the apparatus.

18. The apparatus of claim 17, wherein the value specific to the apparatus is generated within the apparatus by a second pseudo-random generator taking as input a binary word originating from a physical parameter network of the apparatus.

19. The apparatus of claim 15, further comprising a second memory to store the subset of data.

20. The apparatus of claim 15, wherein the combining circuit comprises an X-OR type gate.

21. The apparatus of claim 15, wherein a size of the decryption key corresponds to a size of the subset of data.

22. The apparatus of claim 15, wherein the set of data is a set of computer-executable instructions to be executed.

23. The method of claim 1, further comprising steps to be executed prior to the step of dividing, the steps comprising:
reading from an external memory an encryption key itself encrypted by an encryption method and a public key associated with the encryption method;
reading from a storage element internal to the processor a private key associated with the encryption method;
decrypting the encryption key using the private key and the public key;
reading in the set of data from the external memory;
decrypting the set of data using the encryption key.

* * * * *